United States Patent
Cherniski et al.

(10) Patent No.: US 6,201,711 B1
(45) Date of Patent: Mar. 13, 2001

(54) COMPUTER SYSTEM HOUSING FOR ATTENUATING ELECTROMAGNETIC INFERFERENCE (EMI)

(75) Inventors: Andrew Michael Cherniski, Rescue; Alisa Sandoval, Grass Valley; Donald G. Pauser, Roseville, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/314,484

(22) Filed: May 18, 1999

(51) Int. Cl.[7] .................................................. H05K 7/14
(52) U.S. Cl. ..................... 361/800; 361/796; 361/816; 361/818; 361/801; 361/802; 174/35 R; 174/35 GC; 206/719
(58) Field of Search ................................. 361/683, 724, 361/727, 756, 796, 797, 800, 801–802, 816, 818; 174/35 R, 35 GC; 206/719

(56) References Cited

U.S. PATENT DOCUMENTS

| | | | |
|---|---|---|---|
| 4,214,292 | * | 7/1980 | Johnson ............................... 361/721 |
| 4,328,898 | * | 5/1982 | Grassi ................................ 211/41.17 |
| 5,398,822 | * | 3/1995 | McCarthy et al. ................. 211/41.17 |
| 5,638,259 | * | 6/1997 | McCarthy et al. ................... 361/800 |
| 5,650,922 | * | 7/1997 | Ho ........................................ 361/799 |
| 5,770,822 | * | 6/1998 | Abolitz et al. ....................... 361/800 |
| 5,929,376 | * | 7/1999 | Doun et al. ......................... 174/35 R |
| 5,957,465 | * | 9/1999 | Gonsalves et al. .................. 277/637 |
| 6,018,464 | * | 1/2000 | Kim ..................................... 361/818 |

OTHER PUBLICATIONS

"New! Card Cage Shielding", advertisement in Compliance Engineering: The Magazine for International Regulatory Compliance, 1998 Annual Reference Guide, vol. XV, No. 3, p. A70, (1998).

* cited by examiner

Primary Examiner—Jayprakash N. Gandhi

(57) ABSTRACT

A computer system housing for providing an attenuating barrier for electromagnetic interference (EMI) noise. The computer system housing includes a backplane wall having a plurality of connectors for receiving PCB's, and a bulkhead wall coupled to the backplane wall. The bulkhead wall defines a plurality of bulkhead slots through which connector receptacles of printed circuit boards (PCB's) can extend. An EMI bulkhead gasket is positioned on the bulkhead wall. A conductive metal impregnated, elastomer EMI gasket is positioned on a mounting flange of the bulkhead wall. The computer system housing also includes a plurality of bulkhead plates. The bulkhead plates contact the EMI bulkhead gasket and the elastomer EMI gasket along their entire peripheral edges so that EMI noise is conducted through these gaskets to the bulkhead wall. The computer system housing further includes a bulkhead plate alignment and mounting system that does not employ separable fasteners. This allows "hot plugging" of PCB's to the computer system housing.

33 Claims, 7 Drawing Sheets

COMPUTER SYSTEM HOUSING FOR ATTENUATING ELECTROMAGNETIC INFERFERENCE (EMI)

TECHNICAL FIELD

This invention relates generally to suppressing electromagnetic interference (EMI) within a computer system. In particular, the present invention is a peripheral component interconnect (PCI) computer system housing that includes a bulkhead gasket assembly that suppresses EMI conducted through blank and printed circuit board (PCB) bulkhead plates within the computer system housing. The PCI computer system housing employs a bulkhead plate alignment and mounting system that allows "hot plugging" of PCB's within the PCI computer system housing.

BACKGROUND OF THE INVENTION

As computer system frequencies and power increase, the electromagnetic energy or noise, also known as electromagnetic interference (EMI), radiating from the computer system housing increases proportionally. This EMI noise typically originates from the different components within the computer system, and can interfere with the operation of other pieces of electronic equipment associated with the computer system or in close proximity thereto. As such, computer systems typically need to comply to an electromagnetic compliance (EMC) standard which defines limits to levels of stray EMI noise. To comply with EMC standards and to protect electronic equipment from operation affecting EMI noise, the computer system components that emit EMI noise are generally placed within a shielded enclosure, such as a computer system housing. The computer system housing suppresses EMI noise emanating from computer system components by containing or otherwise diminishing stray EMI noise signals.

One type of computer system housing that attenuates EMI noise employs a PCB input/output (I/O) connection system known as the peripheral component interconnect (PCI) system. The popularity of the PCI system has grown to a point where it is the preferred I/O connection system for larger server computers as well as workstation computers. The PCI system allows one or more microprocessors (i.e., PCB's) to be interconnected with attached external devices.

The PCI system includes a computer system housing defined by a plurality of walls. At least one of these walls is removable to provide access to an interior region of the housing to allow PCB's to be inserted into and removed from the housing. The PCB's are releasably connectable to a central processing unit of the computer system through a mother board, often referred to as a backplane board, as it is vertically mounted as a back wall of the computer system housing.

A wall of the computer system housing adjacent to the backplane board includes a plurality of PCI slots (i.e., between six and twelve total) which are disposed in the computer system housing to provide external access to the PCB's mounted within the housing. Peripheral component connectors on the PCB's extend through these PCI slots so that compatible external devices can be plugged into the PCB via the peripheral component connectors. This wall that includes the PCI slots is often referred to as the bulkhead wall of the computer system housing. In the PCI system, that portion of a PCB that includes the peripheral component connector also includes a bulkhead plate that covers the portion of the respective PCI slot not taken up by the peripheral component connector. In addition, in the PCI system, those PCI slots not currently accommodating a PCB are covered by individual blank bulkhead plates that are substantially identical to the PCB bulkhead plates and function to cover the unused PCI slots. The PCB and blank bulkhead plates are typically secured to the housing, and in particular, to the bulkhead wall via a separate screw fastener.

The walls of the PCI computer system housing generally provide some suppression of the EMI noise produced by the PCB's mounted within the housing. However, EMI noise from the PCB's does radiate from the PCI slots to such an extent that a typical PCI computer system housing does not meet EMC standards. To provide conduction paths to the computer system housing for EMI noise currents to meet EMC standards, bulkhead gaskets are used.

In the typical PCI system, the bulkhead gasket is placed on the interior surface of the bulkhead wall. The bulkhead gasket makes contact with the bulkhead wall and with the bulkhead plates along the two longest sides of the bulkhead plates. Typically, the bulkhead gasket is a thin (0.004") stainless steel metal stamping containing a line of fonned spring tabs as contact points between the bulkhead wall and the bulkhead plates. Because typical PCI slots are arranged close together on 0.80" centers, there is limited space between bulkhead plates. As such, only enough room exits on the bulkhead gasket for either a single row of spring tab contacts which adjacent bulkhead plates must share, or an interlaced pattern of spring tabs which adjacent bulkhead plates do not share. With either arrangement, if adjacent bulkhead plates are misaligned relative to one another, one bulkhead plate will make little or no contact with the bulkhead gasket. Moreover, since this type of bulkhead gasket only contacts the bulkhead plates along their two longest sides, large non-contact gaps are left between the two shortest sides of the bulkhead plates and the bulkhead wall resulting in EMI noise leakage. Without contact or proper contact between the bulkhead plates and the bulkhead gasket, EMI noise will not be conducted to the computer system housing, and as such, the EMI noise will not be suppressed.

As set forth previously, each of the PCB and blank bulkhead plates are typically secured to the housing, and in particular, to the bulkhead wall via a single, separate screw fastener. Each screw passes through a slot within a mounting tab that is integral with and extends at a 90° angle with respect to a main portion of the bulkhead plate. This screw/mounting tab slot configuration must secure and align the bulkhead plate within the PCI computer system housing. Because of this screw/slot mounting arrangement, the close center spacing of the PCI slots, and because the material thickness of the bulkhead plates is very thin (i.e., 0.030"), the bulkhead plates tend to misalign and overlap each other. This misalignment and overlap of the bulkhead plates results in no contact and/or improper contact between the bulkhead plates and the bulkhead gasket. As such EMI noise will not be suppressed, since the EMI noise is properly conducted to the computer system housing.

In addition, the single screw fastener bulkhead plate mounting arrangement exhibits other drawbacks. In particular, the loose screw is susceptible to being lost, or worse, being dropped into the computer system housing. As such, to insert and remove PCB's from the typical PCI computer system housing, power to the computer system must be turned off or a repair technician risks an electrical short caused by a loose screw being dropped into the housing. Hence, the PCI computer system housing described above is not amenable to "hot plugging" of PCB's (i.e., the installation and removal of PCB's to and from the computer system housing with the power to the computer system turned on.

There is a need for an improved PCI computer system housing. In particular, there is a need for a PCI computer system housing that employs a bulkhead gasket assembly that suppresses EMI noise along the entire peripheral edges of the bulkhead plates. In addition, the PCI computer system housing should employ a bulkhead plate alignment and mounting system that properly aligns the bulkhead plates to insure adequate contact between the bulkhead plates and the bulkhead gasket to attenuate EMI noise. Moreover, the bulkhead plate alignment and mounting system should be free of loose fasteners to allow hot plugging of PCB's.

SUMMARY OF THE INVENTION

The present invention is a computer system housing for providing an attenuating barrier for electromagnetic interference (EMI) noise. The computer system housing includes a backplane wall having a plurality of connectors for receiving PCB's, and a bulkhead wall coupled to the backplane wall. The bulkhead wall defines a plurality of bulkhead slots through which connector receptacles of the PCB's can extend. An EMI bulkhead gasket is positioned on the bulkhead wall. The EMI bulkhead gasket defines a plurality of gasket slots in alignment with the bulkhead slots of the bulkhead wall. Each gasket slot is defined by a first side edge, a second side edge disposed opposite to the first side edge and a bight edge connecting the first side edge to the second side edge. Each bight edge includes a plurality of bight edge spring tabs, and the first and second side edges each include a plurality of side edge spring tabs. The bight edge and side edge spring tabs are in contact with the bulkhead wall. The computer system housing also includes a conductive metal impregnated, elastomer EMI gasket positioned on a mounting flange of the bulkhead wall.

The computer system housing further includes a plurality of bulkhead plates. One of the bulkhead plates is associated with each bulkhead slot. Each bulkhead plate has a main portion that contacts the first, second and bight edges of one of the gasket slots. A mounting tab of each bulkhead plate contacts the conductive metal impregnated, elastomer EMI gasket. The mounting tab extends at substantially a 90° angle with respect to the main portion of the bulkhead plate. The EMI bulkhead gasket and the elastomer EMI gasket conduct EMI noise from the bulkhead plates to the bulkhead wall of the computer system housing thereby suppressing the EMI noise.

The computer system housing further comprises an alignment and mounting system for securing the bulkhead plates to the bulkhead wall. The alignment and mounting system includes a bulkhead plate alignment mechanism mounted to the mounting flange of the bulkhead wall. The bulkhead plate alignment mechanism has a first alignment member adjacent to a first side edge of each of the bulkhead slots for engaging a first edge of the mounting tab of the bulkhead plates; and a second alignment member adjacent a second side edge of each of the bulkhead slots for engaging a second side edge of the mounting tab of the bulkhead plates. The first and second alignment members mount the bulkhead plates to the bulkhead wall and align the bulkhead plates with one another and with the bulkhead slots. The computer system housing further comprises a readily removable closure wall. The closure wall includes a plurality of spring fingers that form part of the bulkhead plate alignment and mounting system. Each spring finger has an elastomer element that is engageable with the mounting tabs of the bulkhead plates to secure the bulkhead plates against the EMI bulkhead gasket and the elastomer EMI gasket and between the first and second alignment members.

In this computer system housing of the present invention, the EMI bulkhead gasket and the elastomer EMI gasket suppress EMI noise along the entire peripheral edges of the bulkhead plates. In addition, the bulkhead plate alignment and mounting system properly aligns the bulkhead plates to insure adequate contact between the bulkhead plates and the bulkhead gasket to attenuate EMI noise. Moreover, the bulkhead plate alignment and mounting system does not employ separate fasteners that can be easily dropped within the computer system housing. As such, the bulkhead plate alignment and mounting system allows "hot plugging" of PCB's.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
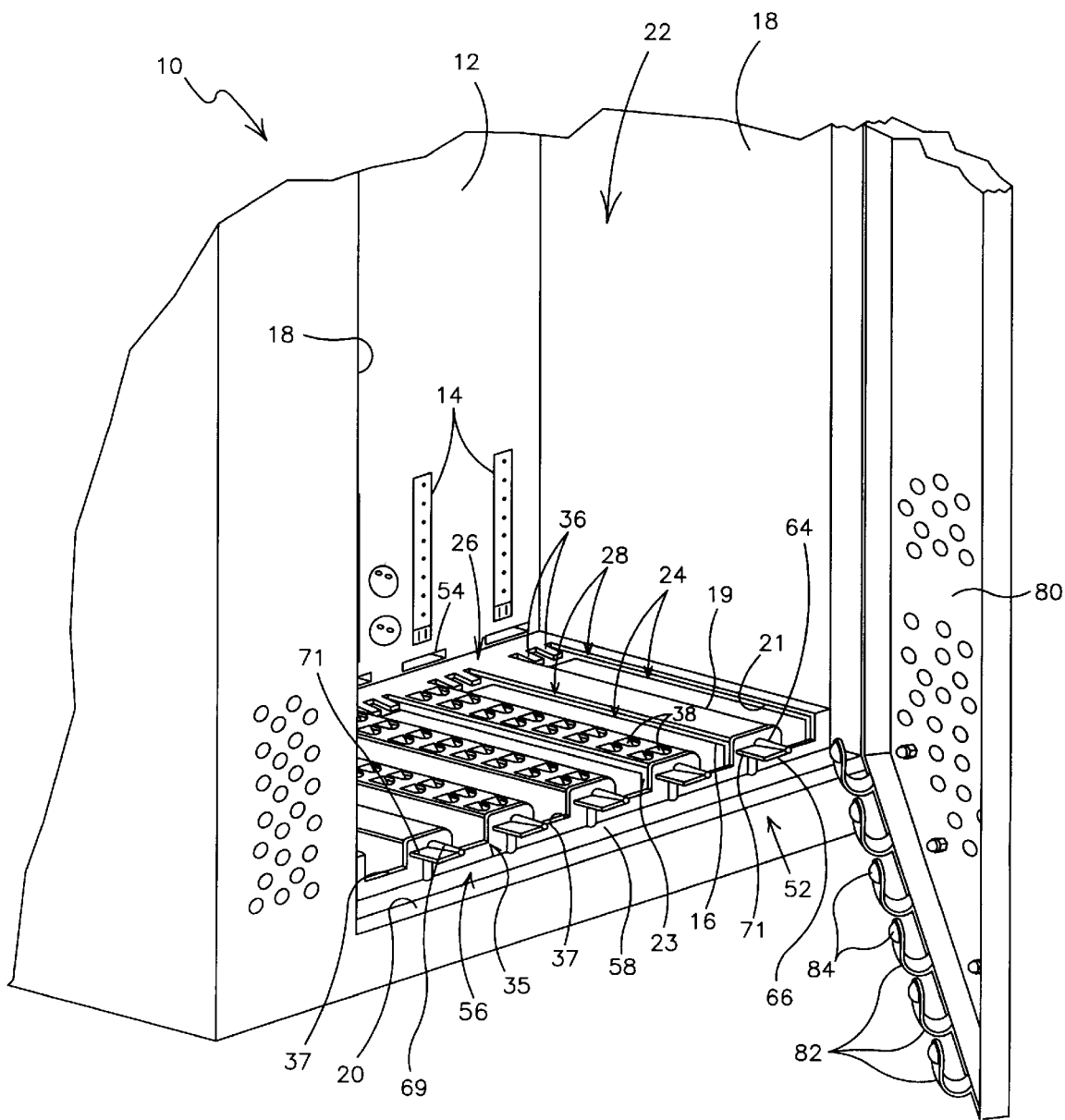
FIG. 1 is a front perspective view of PCI computer system housing for attenuating EMI in accordance with the present invention.

A computer system housing 10 for providing an attenuating barrier for electromagnetic interference (EMI) noise in accordance with the present invention is generally illustrated in FIG. 1. The computer system housing 10 includes a motherboard or backplane wall 12 having a plurality of printed circuit board (PCB) connectors 14. A bulkhead wall 16 is coupled to the backplane wall 12 so as to be substantially perpendicular relative thereto. The computer system housing also includes a first, second and third side walls 18 (only two of which are shown in FIG. 1) which are coupled to the backplane wall 12. The first and third side walls 18 are further coupled to the bulkhead wall 16 and the third side wall with all connections between the side walls 18, the backplane wall 12 and the bulkhead wall 16 being substantially perpendicular. The backplane wall 12 together with the bulkhead wall 16 and the side walls 18 define an opening 20 into an interior region 22 of the computer system housing 10.

Figure 6:
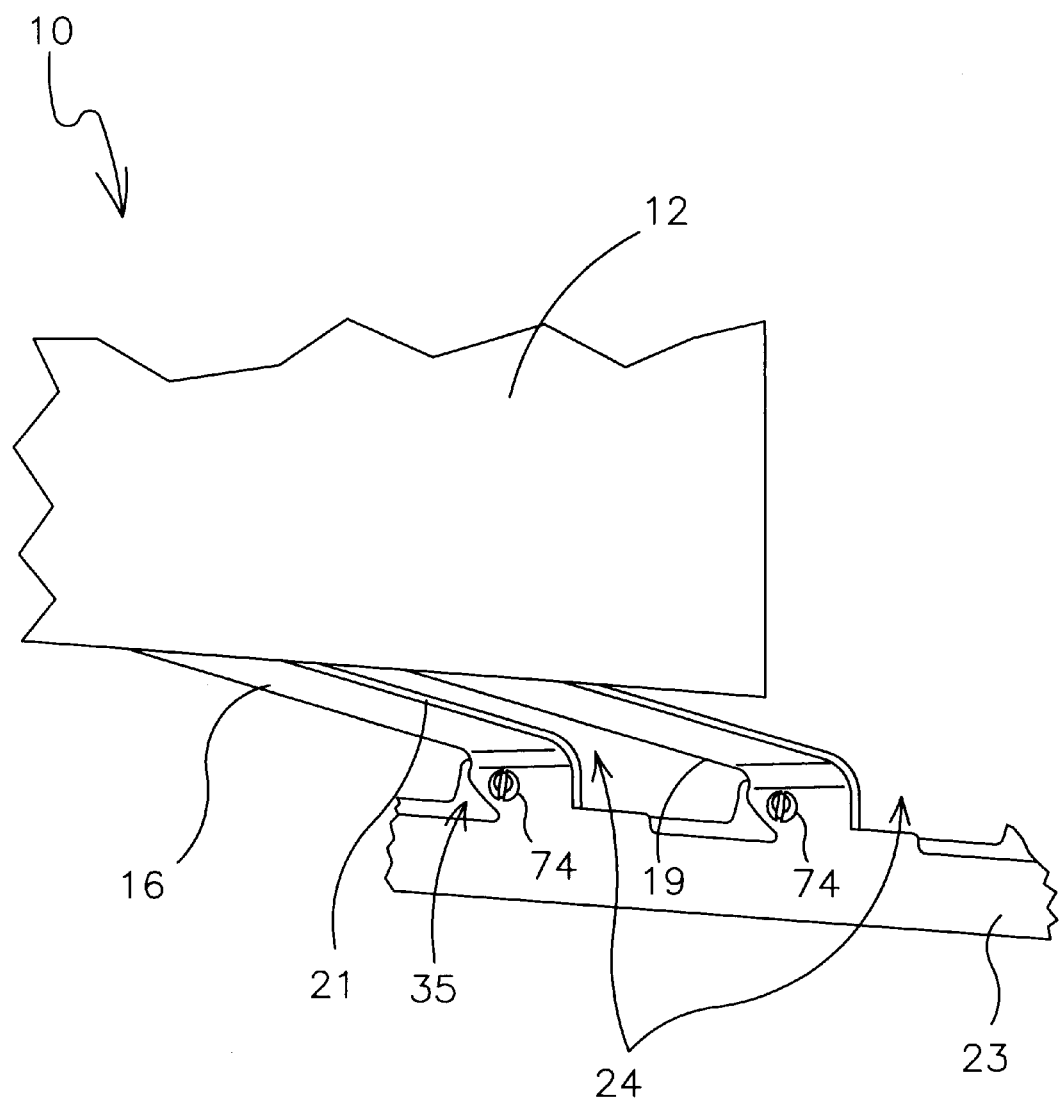
FIG. 6 is a rear perspective view of a bulkhead wall of the computer system housing of FIG. 1 showing details of the mounting members of the bulkhead plate alignment mechanism in accordance with the present invention.

As seen best in FIGS. 1 and 6, the bulkhead wall 16 includes a mounting flange 23 that extends substantially perpendicular to the main portion of the bulkhead wall 16. The bulkhead wall 16 further defines a plurality of bulkhead slots 24 that correspond to and are in alignment with the PCB connectors 14. Each of the bulkhead slots 24 includes a first side edge 19 and a second side edge 21 parallel thereto. Six bulkhead slots 24 are illustrated in FIG. 1, but the bulkhead wall 16 can include any number of bulkhead slots 24 depending upon the application to which the computer system housing 10 is to be used. An EMI bulkhead gasket 26, that defines part of an EMI gasket assembly, is positioned on an interior surface of the bulkhead wall 16. The EMI bulkhead gasket 26 includes a plurality of extensions 25 that define a plurality of gasket slots 28 that correspond to and are in alignment with the bulkhead slots 24 of the bulkhead wall 16. Each extension 25 includes a mounting tab 31 having a mounting aperture 33.

Figure 2:
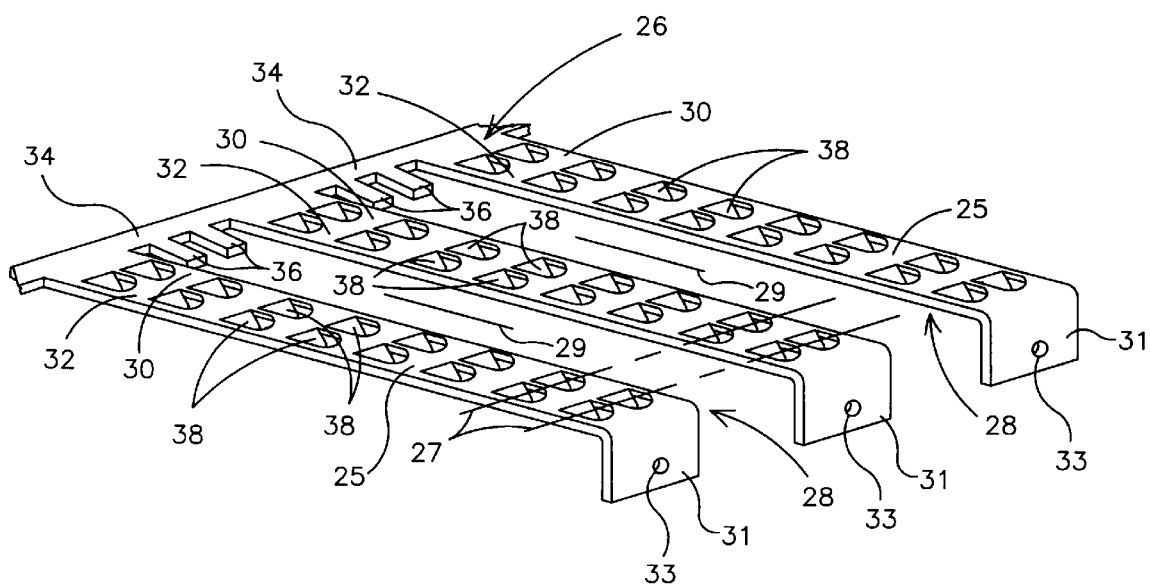
FIG. 2 is a partial, top elevational view of an EMI bulkhead gasket used in the computer system housing shown in FIG. 1.

As seen best in FIG. 2, each gasket slot 28 is defined by a first side edge 30, a second side edge 32 disposed opposite to the first side edge 30 and a bight edge 34 connecting the first side edge 30 to the second side edge 32. The gasket slots 28 are located such that the bight edges 34 of the gasket slots 28 are positioned adjacent to the backplane wall 12. Each bight edge 34 of the gasket slots 28 includes a plurality of bight edge spring tabs 36 that are bent out of the plane of the EMI bulkhead gasket 26. In addition, the first and second side edges 30 and 32 of each gasket slot 28 include side edge spring tabs 38 that are bent out of the plane of the EMI bulkhead gasket 26. The bight edge and side edge spring tabs 36 and 38 contact the bulkhead wall 16. As seen best in FIG. 2, the side edge spring tabs 38 of the first and second side edges 30 and 32 of each one of the gasket slots 28 are in alignment with one another as represented by the alignment lines 27. In addition, as seen in FIG. 2 and represented by the alignment lines 27, the side edge spring tabs 38 of the first and second side edges 30 and 32 of each one of the gasket slots 28 is in alignment with the side edge spring tabs 38 of the first and second side edges 30 and 32 of the adjoining gasket slots 28. Each of the gasket slots 28 of the EMI bulkhead gasket 26 includes a longitudinal centerline 29 that extends parallel to the first and second side edges 30 and 32 of the gasket slots 28.

In one preferred embodiment, the longitudinal centerline 29 of each gasket slot 28 is spaced from adjoining gasket slots 28 by a distance of substantially 0.90". As such, since the gasket slots 28 correspond to and are aligned with the bulkhead slots 24, the bulkhead slots 24 also exhibit 0.90" centers. In addition, in the one preferred embodiment, the EMI bulkhead gasket 26 is defined by a gasket plate formed of a flat, flexible, electrically conducive material such as stainless steel which is 0.004" thick. The bight edge and side edge spring tabs 36 and 38 are formed by a die cutting stamping machine that cuts the spring tabs and bends the spring tabs out of the plane of the gasket plate defining the EMI bulkhead gasket 26.

Figure 4:
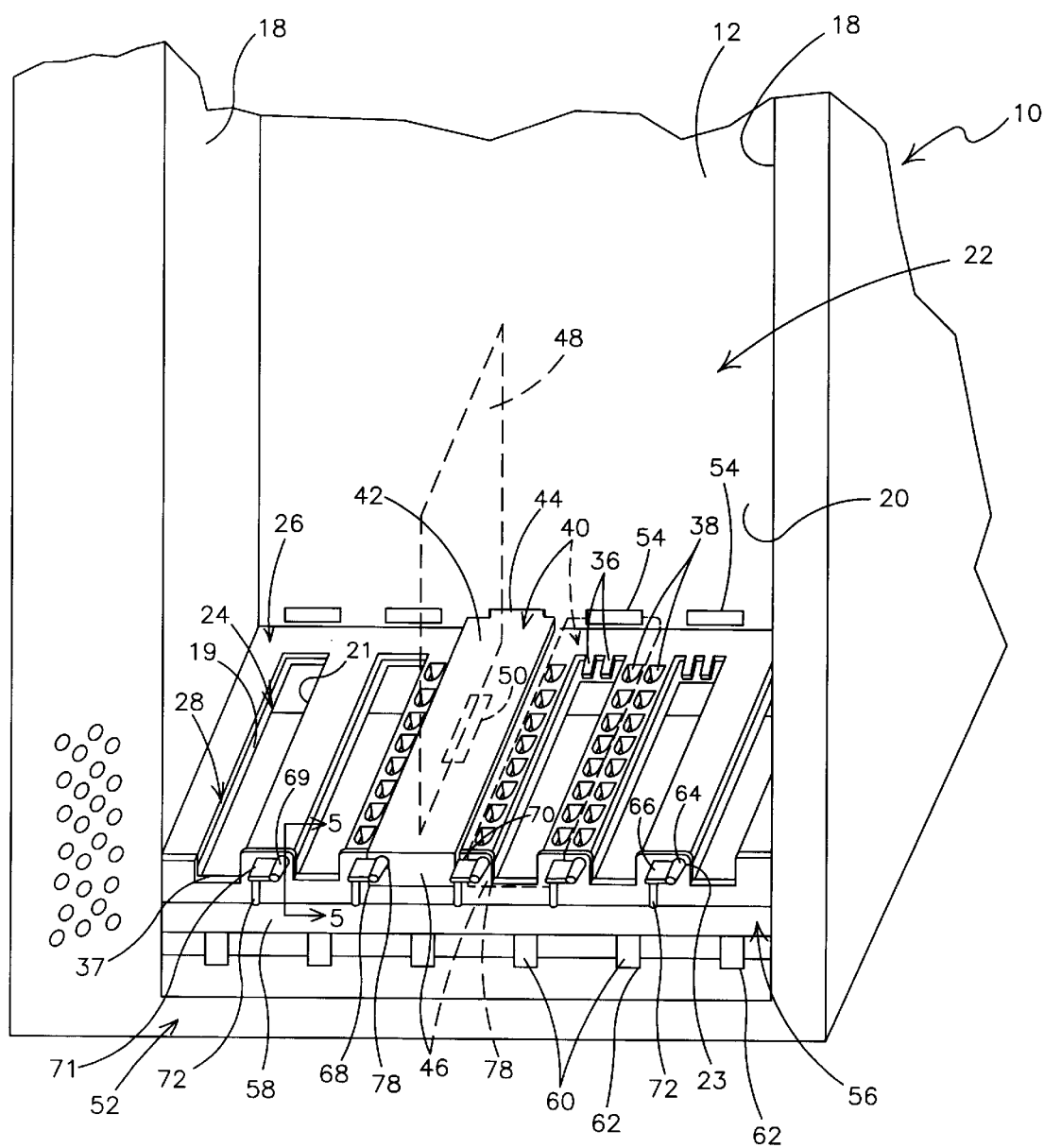
FIG. 4 is a front perspective view similar to FIG. 1 showing the bulkhead plate of FIG. 3 mounted within the computer system housing and a bulkhead plate alignment mechanism in accordance with the present invention.
Figure 5:
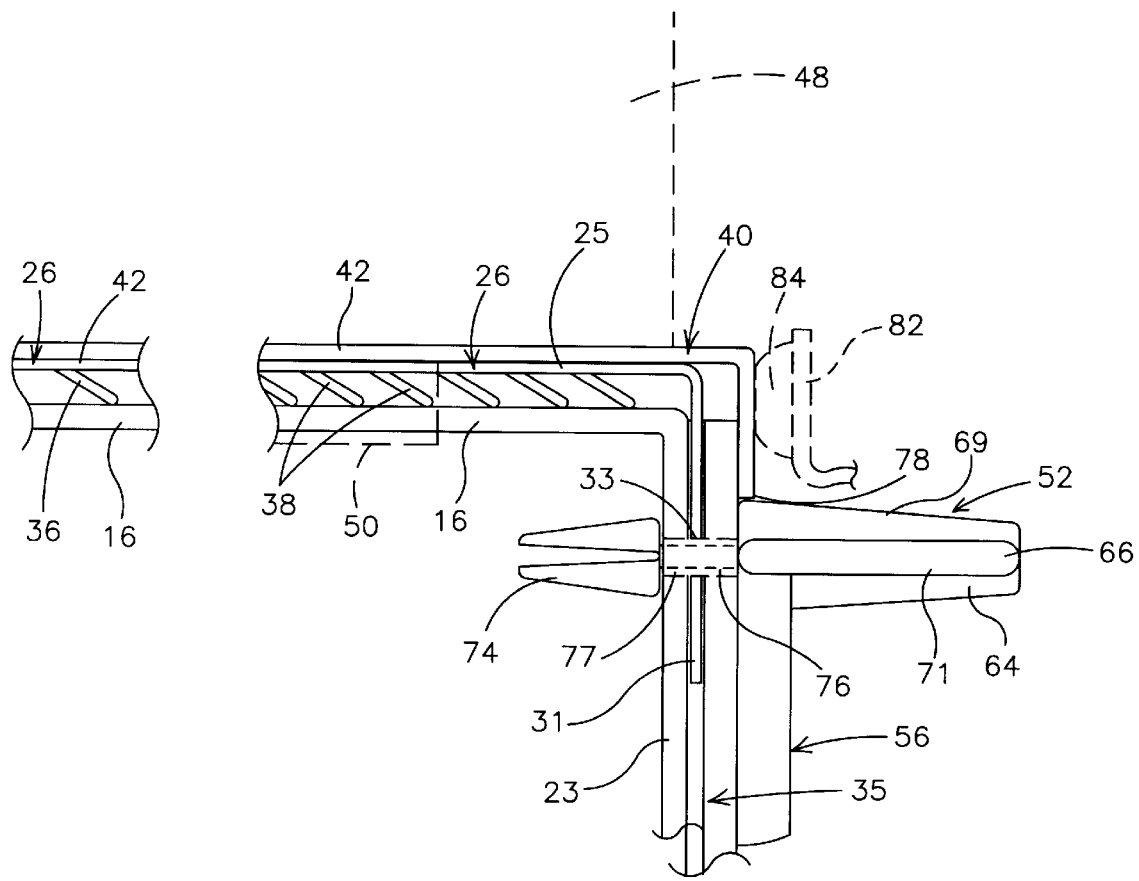
FIG. 5 is a sectional view taken along line 5—5 in FIG. 4.

As seen in FIGS. 1, 4 and 5, the computer system housing 10 further includes a conductive metal impregnated, elastomer EMI gasket 35, which, together with the EMI bulkhead gasket 26 define the EMI gasket assembly of the computer system housing 10. The elastomer EMI gasket 35 is mounted to the mounting flange 23 of the bulkhead wall 16. The elastomer EMI gasket 35 includes a plurality of cutout regions 37 that correspond with and are in alignment with the bulkhead slots 24 and the gasket slots 28. In one preferred embodiment, the conductive metal impregnated, elastomer EMI gasket 35 is formed from rubber impregnated with silver particles. Alternatively, the conductive metal impregnated, elastomer EMI gasket 35 can be formed of rubber impregnated with nickel particles.

Figure 3:
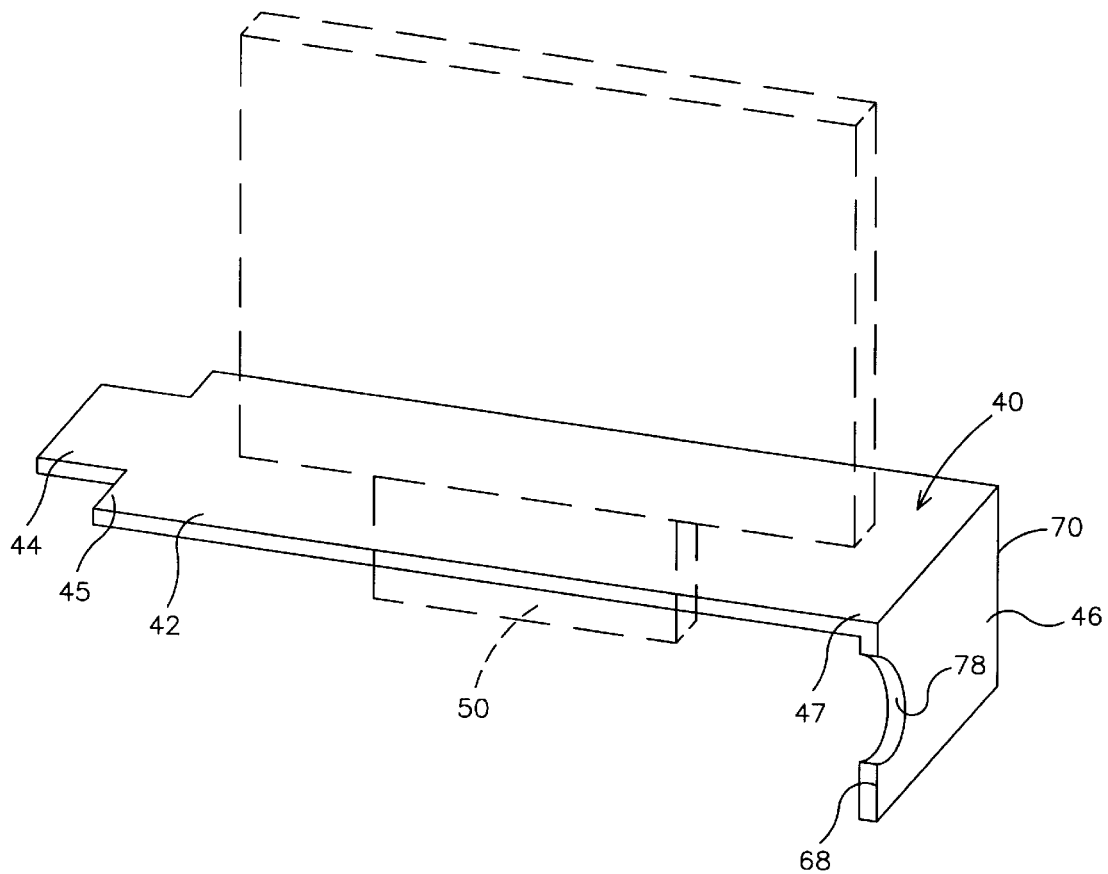
FIG. 3 is a perspective view of a bulkhead plate used in the computer system housing shown in FIG. 1.

As seen in FIGS. 3 and 4, the computer system housing 10 further includes a plurality of readily removable bulkhead plates 40. One bulkhead plate 40 is associated with each bulkhead slot 24, however, only two of the bulkhead plates 40 (one shown in solid lines and another shown in dashed lines) are illustrated in FIG. 4 for clarity. As seen best in FIG. 2, each bulkhead plate 40 includes a rectangular shaped main portion 42, a first mounting tab 44 at a first end 45 of the main portion 42, and a second mounting tab 46 at a second opposite end 47 of the main portion 42. The second mounting tab 46 extends at substantially a 90° angle with respect to the main portion 42.

As shown in dashed lines in FIG. 3, the main portion 42 of the bulkhead plates 40 may include a PCB 48. In addition as shown in dashed lines in FIG. 3, the main portion 42 of the bulkhead plates 40 may further include a peripheral component connector receptacle 50 which is connected to the PCB 48. The peripheral component connector receptacle 50 accepts plug compatible peripheral components that function with the PCB 48. In addition, as shown in solid lines in FIG. 3, the main portion 42 of the bulkhead plates 40 may not include either of the PCB 48 or the connector receptacle 50. This bulkhead plate 40 is referred to as a blank bulkhead plate.

It is to be understood that the computer system housing 10 may include any combination of these three types of bulkhead plates 40. For example, blank bulkhead plates 40 may be positioned at two of the bulkhead slots 24, while two other bulkhead plates 40 with PCB's 48 may be positioned at two other of the bulkhead slots 24, while still two further bulkhead plates 40 with PCB's 48 and connector receptacles 50 may be positioned at the two remaining bulkhead slots 24. In the case of bulkhead plates 40 with PCB's 48, the PCB's 48, upon installation of the bulkhead plates 40 into the computer system housing 10, are connected to the PCB connectors 14 on the backplane wall 12. This allows the PCB's 48 to interact with a central processing unit associated with the backplane wall 12 of the computer system housing 10. In addition, in the case of bulkhead plates 40 with connector receptacles 50, the connector receptacles 50, upon installation of the bulkhead plates 40 into the computer system housing 10, extend through the gasket slots 28 and the bulkhead slots 24 to allow peripheral components to be attached to the connector receptacles 50, and thereby to the PCB's 48, from an exterior region of the computer system housing 10.

As seen best in FIG. 4, the bulkhead plates 40 are releasably mountable within the computer system housing 10 at the bulkhead slots 24/gasket slots 28. When the bulkhead plates 40 are positioned at the bulkhead slots 24/gasket slots 28, the main portion 42 of each of the bulkhead plates 40 contacts the first, second and bight edges 30, 32 and 34 of the respective gasket slot 28 of the EMI bulkhead gasket 26. In addition, the second mounting tab 46 contacts the conductive metal impregnated, elastomer EMI gasket 35. As a result, the entire peripheral edge of each of the bulkhead plates 40 is in complete contact with the EMI bulkhead gasket 26 and the elastomer EMI gasket 35 such that no gaps exist. As such EMI noise, such as may be produced by the PCB's 48, is conducted along the conductive path defined by the EMI bulkhead gasket 26 and the elastomer EMI gasket 35. In particular, EMI noise is conducted from the bulkhead plates 40 through the first, second and bight edges 30, 32 and 34 of the gasket slots 28 of the EMI bulkhead gasket 26, and through elastomer EMI gasket 35 to the bulkhead wall 16 of the computer system housing 10, thereby suppressing (i.e., attenuating) the EMI noise.

As seen best in FIGS. 1 and 4, the computer system housing 10 further includes a bulkhead plate alignment and mounting system 52 for properly securing the bulkhead plates 40 against the EMI bulkhead gasket 26 and the elastomer EMI gasket 35; and for properly aligning the bulkhead plates 40 with the bulkhead slots 24/gasket slots 28. The bulkhead plate alignment and mounting system 52 comprises a backplane wall mounting mechanism defined by a plurality of mounting channels 54 formed in the backplane wall 12 immediately adjacent the bulkhead wall 16. One of the mounting channels 54 corresponds to and is in alignment with each of the bulkhead slots 24/gasket slots 28. Each of the mounting channels 54 receives the first mounting tab 44 of one of the bulkhead plates 40 to secure the first ends 45 of the bulkhead plates 40 to the computer system housing 10, and the main portions 42 of the bulkhead plates 40 in engagement (i.e., contact) with the EMI bulkhead gasket 26.

As seen in FIGS. 1, 4 and 5, the bulkhead plate alignment and mounting system 52 further comprises a bulkhead plate alignment mechanism 56 which is mounted to the mounting flange 23 of the bulkhead wall 16. The bulkhead plate alignment mechanism 56 is mounted to the mounting flange 23 such that the mounting tabs 31 of the extensions 25 of the EMI bulkhead gasket 26 and the elastomer EMI gasket 35 are positioned between the mounting flange 23 and the bulkhead plate alignment mechanism 56. The bulkhead plate alignment mechanism 56 functions to also secure the EMI bulkhead gasket 26 and the elastomer EMI gasket 35 to the mounting flange 23 of the bulkhead wall 16.

The bulkhead plate alignment mechanism 56 includes a main member 58 having a plurality of spaced extensions 60. The spaced extensions 60 are received within corresponding cutout regions 62 on the mounting flange 23 to properly orient the main member 58 of the bulkhead plate alignment mechanism 56 on the bulkhead wall 16. The main member 56 further includes a first alignment member 64 adjacent to the first side edge 19 of each of the bulkhead slots 24, and a second alignment member 66 adjacent to the second side edge 21 of each of the bulkhead slots 24. The first alignment members 64 engage a first edge 68 of the second mounting tabs 46 of the bulkhead plates 40, while the second alignment members 66 engage a second edge 70 of the second mounting tabs 46 of the bulkhead plates 40. In particular, the first alignment member 64 has a cone shaped alignment surface 69, while the second alignment member 66 has an inclined alignment surface 71. The cone shaped and inclined alignment surfaces 69 and 71 function to guide the second mounting tabs 46, and thereby the bulkhead plates 40, onto the EMI bulkhead gasket 26/bulkhead wall 16 so that the bulkhead plates 40 are aligned with one another and the bulkhead slots 24/gasket slots 28. As seen in FIGS. 3 and 4, each of the second mounting tabs 46 of the bulkhead plates 40 defines a semi-circular cutout 78 that receives the cone shaped alignment surface 69 of the first alignment member 64. Interaction of the semicircular cutouts 78 and the cone shaped alignment surfaces 69 functions to mount the bulkhead plates 40 to the bulkhead wall 16 so that the main portions 42 of the bulkhead plates 40 properly contact the EMI bulkhead gasket 26.

As seen best in FIG. 4, the first and second alignment members 64 and 66 are joined to one another, and are joined to the main member 56 of the bulkhead plate alignment mechanism 56 via further spaced extensions 72. As seen best in FIGS. 5 and 6, a rear surface of the first alignment member 64 includes a split barrel mounting member 74. Each of the mounting members 74 is adapted to be snap-fit through an aperture 76 in the elastomer EMI gasket 35, the mounting aperture 33 of the EMI bulkhead gasket 26, and an aperture 77 in the mounting flange 23 to secure the bulkhead plate alignment mechanism 56, the EMI bulkhead gasket 26 and the elastomer EMI gasket 35 to the bulkhead wall 16. In one preferred embodiment, the main member 58, the extensions 60, the first and second alignment members 64, 66, the further extensions 72, and the mounting members 74 are formed as a single integral unit from plastic.

Figure 7:
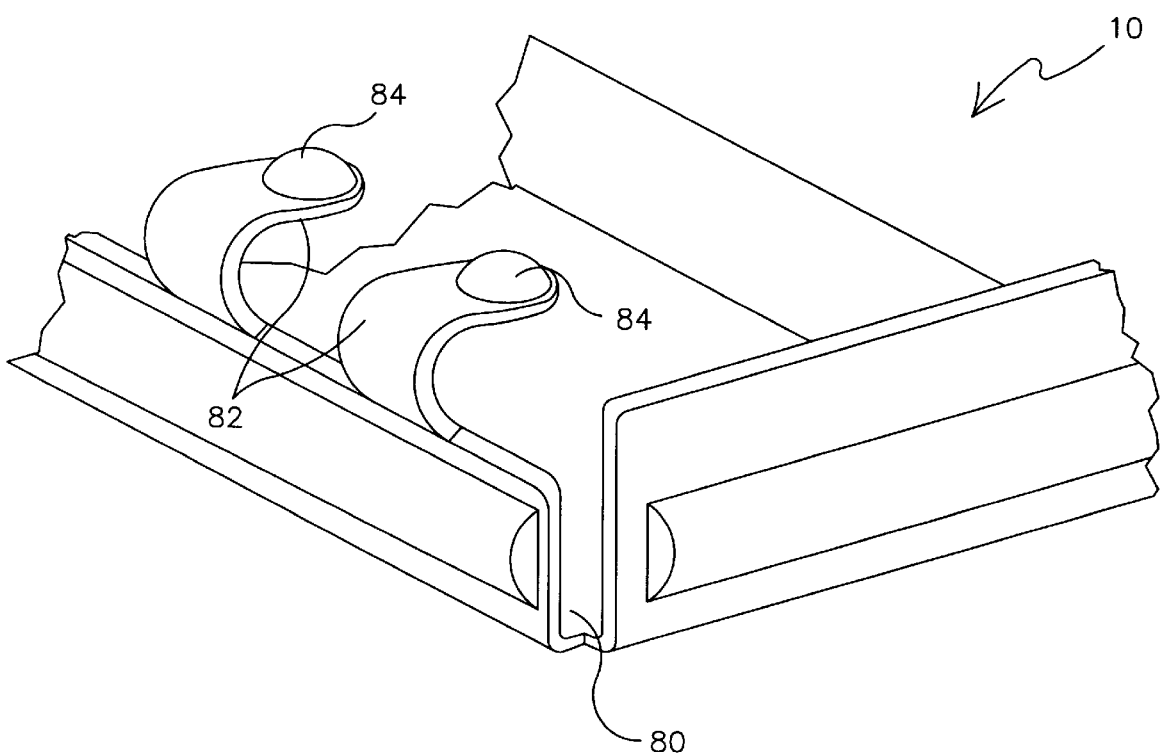
FIG. 7 is a perspective view showing details of a closure wall of the computer system housing shown in FIG. 1.

As seen in FIG. 1, the opening 20 of the computer system housing 10 is closeable via a readily removable closure wall 80 that is releasably engageable with side walls 18 and the bulkhead wall 16. The closure wall 80 when removed from the computer system housing 10 provides access to the interior region 22 of the housing 10 so that bulkhead plates 40 (i.e., PCB's 48) can be inserted to and removed from the housing 10. As seen in FIGS. 5 and 7, the bulkhead plate alignment and mounting system 52 further comprises a plurality of spaced spring fingers 82 on the closure wall 80. Each spring finger 82 has an elastomeric element 84 mounted to a free end thereof. When the closure wall 80 is mounted to the side walls 18 and the bulkhead wall 16, each of the elastomeric elements 84 of the spring fingers 82 functions to engage one of the second mounting tabs 46 of the bulkhead plates 40, to secure the bulkhead plates 40 against the elastomer EMI gasket 35 and between the first and second alignment members 64 and 66.

In this computer system housing 10 of the present invention, the EMI bulkhead gasket 26 and the elastomer EMI gasket 35 suppress EMI noise along the entire peripheral edges of the bulkhead plates 40. In addition, the bulkhead plate alignment and mounting system 52 properly aligns the bulkhead plates 40 to insure adequate contact between the bulkhead plates 40 and the EMI gaskets 26 and 35 to attenuate EMI noise. Moreover, the bulkhead plate alignment and mounting system 52 does not employ separate fasteners that can be easily dropped within the computer system housing 10. As such, the bulkhead plate alignment and mounting system 52 allows "hot plugging" of PCB's 48.

Although the present invention has been described with reference to preferred embodiments, workers skilled in the art will recognize that changes may be made in form and detail without departing from the spirit and scope of the invention.

What is claimed is:

1. A computer system housing for providing an attenuating barrier for electromagnetic interference (EMI) noise, the computer system housing comprising:

a backplane wall having a plurality of connectors for receiving printed circuit board's (PCB's);

a bulkhead wall coupled to the backplane wall, the bulkhead wall defining a plurality of bulkhead slots through which connector receptacles of the PCB's can extend;

an EMI gasket assembly on the bulkhead wall, the EMI gasket assembly defining a plurality of gasket slots in alignment with the bulkhead slots of the bulkhead wall; and a plurality of bulkhead plates with each bulkhead plate having a peripheral edge, one of the bulkhead plates being associated with each bulkhead slot with substantially the entire peripheral edge of each bulkhead plate contacting the EMI gasket assembly, such that EMI noise is conducted through the EMI gasket assembly, at the gasket slots, to the bulkhead wall of the computer system housing thereby suppressing the EMI noise.

2. The computer system housing of claim 1 wherein the EMI gasket assembly includes:

an EMI bulkhead gasket on the bulkhead wall, the EMI bulkhead gasket defining the plurality of gasket slots in alignment with the bulkhead slots of the bulkhead wall, each gasket slot being defined by a first side edge, a second side edge disposed opposite to the first side edge and a bight edge connecting the first side edge to the second side edge, each bight edge including a plurality of bight edge spring tabs that are in contact with the bulkhead wall such that each bulkhead plate contacts a bight edge of one of the gasket slots for conducting EMI noise through the EMI bulkhead gasket, at the bight edge of each gasket slot, to the bulkhead wall of the computer system housing thereby suppressing the EMI noise.

3. The computer system housing of claim 2 wherein the first and second side edges of each gasket slot include side edge spring tabs that are in contact with the bulkhead wall, and wherein each bulkhead plate contacts the first and second side edges of one of the gasket slots so that EMI noise is conducted through the EMI bulkhead gasket, at the first and second side edges of each gasket slot, to the bulkhead wall of the computer system housing thereby suppressing the EMI noise.

4. The computer system housing of claim 3 wherein the bight edges of the gasket slots are positioned adjacent to the backplane wall.

5. The computer system housing of claim 3 wherein the side edge spring tabs of the first and second side edges of each one of the gasket slots are in alignment with one another.

6. The computer system housing of claim 3 wherein the side edge spring tabs of the first and second side edges of one of the gasket slots are in alignment with the side edge spring tabs of the first and second side edges of an adjoining one of the gasket slots.

7. The computer system housing of claim 2 wherein the EMI bulkhead gasket is formed of a flexible electrically conductive material.

8. The computer system housing of claim 2 wherein each of the gasket slots of the EMI bulkhead gasket has a longitudinal centerline extending parallel to the first and second side edges of the gasket slot, and wherein the centerline of each gasket slot is spaced from an adjoining one of the gasket slots by a distance of substantially 0.90 inches.

9. The computer system housing of claim 3 wherein each bulkhead plate includes:

a rectangular shaped main portion;
a first mounting tab at a first end of the main portion; and
a second mounting tab at a second opposite end of the main portion, the second mounting tab extending at substantially a 90° angle with respect to the main portion.

10. The computer system housing of claim 9 wherein the main portion of at least one of the bulkhead plates includes a printed circuit board (PCB).

11. The computer system housing of claim 9 wherein the main portion of at least one of the bulkhead plates includes a printed circuit board (PCB) having a connector receptacle that extends from the main portion and through one of the gasket slots and one of the bulkhead slots.

12. The computer system housing of claim 9 wherein at least one of the bulkhead plates is a blank bulkhead plate.

13. The computer system housing of claim 9 wherein the main portion of each bulkhead plate contacts the first and second side edges and the bight edge of one of the gasket slots.

14. The computer system housing of claim 13, and further including a bulkhead plate alignment and mounting system, the bulkhead plate alignment and mounting system including:

the backplane wall which defines a plurality of mounting channels, with one of the mounting channels being in alignment with each of the gasket slots of the EMI bulkhead gasket, each of the mounting channels receiving the first mounting tab of one of the bulkhead plates to secure the first ends of the bulkhead plates to the computer system housing and the main portions of the bulkhead plates in contact with the EMI bulkhead gasket.

15. The computer system housing of claim 14 wherein the bulkhead wall includes a mounting flange spaced from the backplane wall, and wherein the bulkhead plate alignment and mounting system includes a bulkhead plate alignment mechanism which is mounted to the mounting flange of the backplane wall.

16. The computer system housing of claim 15 wherein the bulkhead plate alignment mechanism includes:

a first alignment member adjacent the first side edge of each of the gasket slots for engaging a first edge of the second mounting tab; and
a second alignment member adjacent the second side edge of each of the gasket slots for engaging a second edge of the second mounting tab.

17. The computer system housing of claim 16 wherein the first alignment member has a cone shaped alignment surface, and wherein the second alignment member has an inclined alignment surface.

18. The computer system housing of claim 17 wherein the second mounting tab of each of the bulkhead plates defines a semi-circular cutout that receives the cone shaped alignment surface of the first alignment member.

19. The computer system housing of claim 16, wherein the EMI gasket assembly further includes:

a conductive metal impregnated elastomer gasket positioned between the bulkhead wall mounting flange and the bulkhead plate alignment mechanism, the second mounting tab engaging the conductive metal impregnated elastomer gasket such that EMI noise is conducted through the conductive metal impregnated elastomer gasket to the bulkhead wall ot the computer system housing thereby suppressing the EMI noise.

20. The computer system housing of claim 19, and further including:

a plurality of side walls coupled to the backplane wall, at least two of the plurality of side walls being coupled to the bulkhead wall; and
a readily removable closure wall releasably engaging the side walls and the bulkhead wall, the closure wall when removed providing access to an interior region of the computer system housing so that bulkhead plates and PCB's can be inserted to and removed from the interior region of the computer system housing.

21. The computer system housing of claim 20 wherein the bulkhead plate alignment and mounting system further includes:

a plurality of spring fingers on the closure wall, each spring finger having an elastomeric element mounted to a free end thereof, each of the elastomeric elements of the spring fingers engaging the second mounting tab of one of the bulkhead plates to secure the bulkhead plates against the conductive metal impregnated elastomer gasket and between the first and second alignment members.

22. An electromagnetic interference (EMI) bulkhead gasket for providing an attenuating barrier for EMI noise in a computer system housing, the computer system housing having a bulkhead wall defining a plurality of bulkhead slots through which connector receptacles of printed circuit boards can extend, and a plurality of bulkhead plates mountable to the bulkhead wall over the bulkhead slots, the EMI bulkhead gasket comprising:

a gasket plate comprising a flat, flexible, electrically conductive material for mounting to an interior surface of the bulkhead wall of the computer system housing, the gasket plate defining a plurality of gasket slots in alignment with the bulkhead slots of the bulkhead wall, each gasket slot being defined by a first side edge, a second side edge disposed opposite to the first side edge and a bight edge connecting the first side edge to the second side edge, each bight edge including a plurality of bight edge spring tabs that are in contact with the bulkhead wall, such that the bulkhead plates are mountable to the bulkhead wall with the bight edges of the gasket plate therebetween, so that EMI noise from the bulkhead plates is conducted through the bight edges of the gasket plate to the bulkhead wall of the computer system housing thereby suppressing the EMI noise.

23. The EMT bulkhead gasket of claim 22 wherein the first and second side edges of each gasket slot include side edge spring tabs that are in contact with the bulkhead wall, and wherein each bulkhead plate contacts the first and second side edges of one of the gasket slots so that EMI noise is conducted through the EMI bulkhead gasket, at the first and second side edges of each gasket slot, to the bulkhead wall of the computer system housing thereby suppressing the EMI noise.

24. The EMI bulkhead gasket of claim 23 wherein the side edge spring tabs of the first and second side edges of each one of the gasket slots are in alignment with one another.

25. The EMI bulkhead gasket of claim 23 wherein the side edge spring tabs of the first and second side edges of one of the gasket slots are in alignment with the side edge spring tabs of the first and second side edges of an adjoining one of the gasket slots.

26. The EMI bulkhead gasket of claim 22 wherein each of the gasket slots of the gasket plate has a longitudinal centerline extending parallel to the first and second side edges of the gasket slot, and wherein the centerline of each gasket slot is spaced from an adjoining one of the gasket slots by a distance of substantially 0.90 inches.

27. The EMI bulkhead gasket of claim 23, and further including:

a conductive metal impregnated elastomer gasket positioned on a mounting flange of the bulkhead wall, a mounting tab of each of the bulkhead plates engaging the conductive metal impregnated elastomer gasket such that EMI noise is conducted through the conductive metal impregnated elastomer gasket to the bulkhead wall of the computer system housing thereby suppressing the EMI noise.

28. An alignment and mounting system for securing bulkhead plates to a bulkhead wall of a computer system housing, the alignment and mounting system comprising:

a bulkhead wall defining a plurality of bulkhead slots through which connector receptacles of printed circuit boards (PCB's) can extend, the bulkhead wall having a mounting flange;

a plurality of bulkhead plates, one of the bulkhead plates being associated with each bulkhead slot, each bulkhead plate including:
a main portion that extends over the bulkhead slot; and
a mounting tab at one end of the main portion, the mounting tab extending at substantially a 90° angle with respect to the main portion; and a bulkhead plate alignment mechanism mounted to the mounting flange of the bulkhead wall, the bulkhead plate alignment mechanism including:
a first alignment member adjacent a first side edge of each of the bulkhead slots for engaging a first edge of the mounting tab of the bulkhead plates; and
a second alignment member adjacent a second side edge of each of the bulkhead slots for engaging a second side edge of the mounting tab of the bulkhead plates, the first and second alignment members mounting the bulkhead plates to the bulkhead wall and aligning the bulkhead plates with one another and with the bulkhead slots.

29. The alignment and mounting system of claim 28 wherein the first alignment member has a cone shaped alignment surface, and wherein the second alignment member has an inclined alignment surface.

30. The alignment and mounting system of claim 29 wherein the mounting tab of each of the bulkhead plates defines a semi-circular cutout that receives the cone shaped alignment surface of the first alignment member.

31. The alignment and mounting system of claim 28 wherein the first alignment member is coupled to the second alignment member, and wherein bulkhead plate alignment mechanism further includes a main member coupled to the first and second alignment members to form a single unit.

32. The alignment and mounting system of claim 31 wherein the main member includes a plurality of spaced extensions that are received with cutout regions on the mounting flange of the bulkhead wall for properly aligning the main member and the first and second alignment members on the mounting flange.

33. The alignment and mounting system of claim 32 wherein each of the first alignment members includes a mounting member, each of the mounting members extending through an aperture in the mounting flange of the bulkhead wall for securing the bulkhead alignment mechanism to the mounting flange.

* * * * *

UNITED STATES PATENT AND TRADEMARK OFFICE
CERTIFICATE OF CORRECTION

PATENT NO.    : 6,201,711 B1
DATED         : March 13, 2001
INVENTOR(S)   : Andrew M. Cherniski et al.

It is certified that error appears in the above-identified patent and that said Letters Patent is hereby corrected as shown below:

Title page,
Item [54], Title, please delete "COMPUTER SYSTEM HOUSING FOR ATTENUATING ELECTROMAGNETIC INFERFERENCE (EMI)" and insert -- COMPUTER SYSTEM HOUSING FOR ATTENUATING ELECTROMAGNETIC INTERFERENCE (EMI) --.

Column 2,
Line 19, please delete "fonned" and insert -- formed --.

Column 10,
Line 50, please delete "ot the" and insert -- to the --.

Signed and Sealed this

Thirty-first Day of December, 2002

JAMES E. ROGAN
*Director of the United States Patent and Trademark Office*